Oct. 26, 1965     L. H. FIRST     3,213,779
SPATULA
Filed June 19, 1963
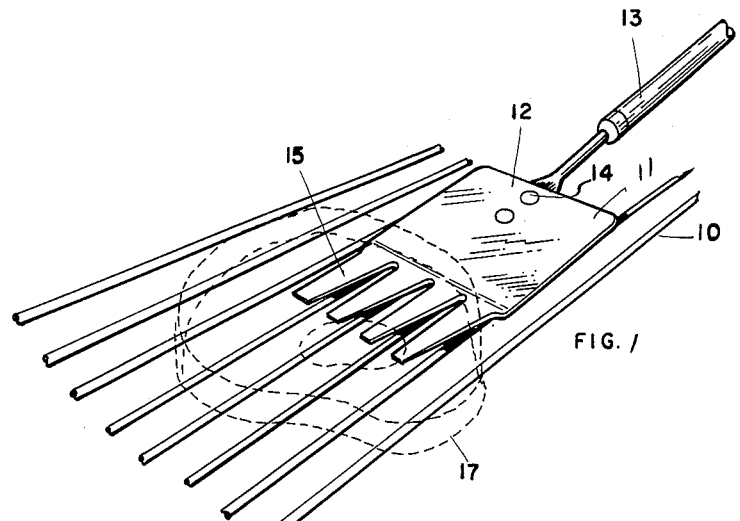
FIG. 1
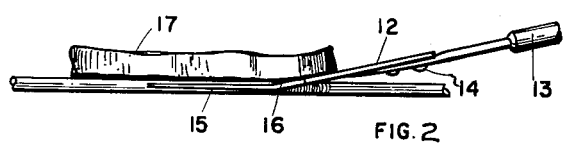
FIG. 2
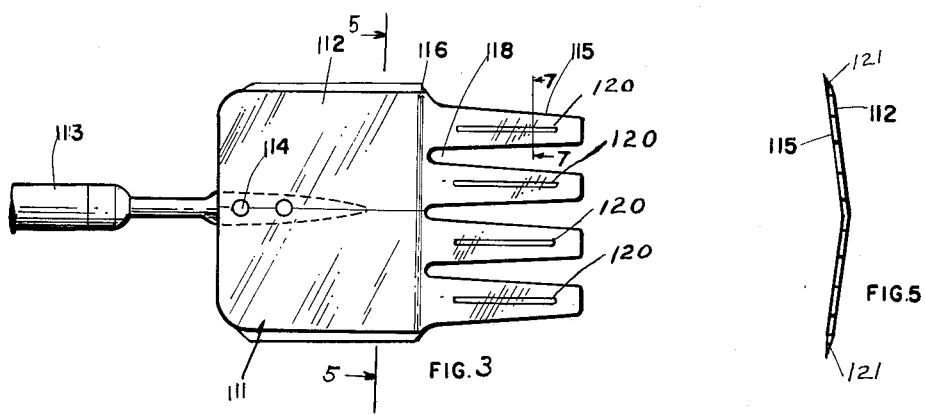
FIG. 3
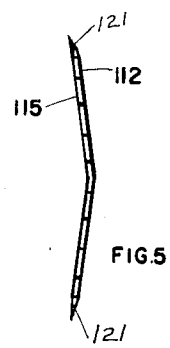
FIG. 5
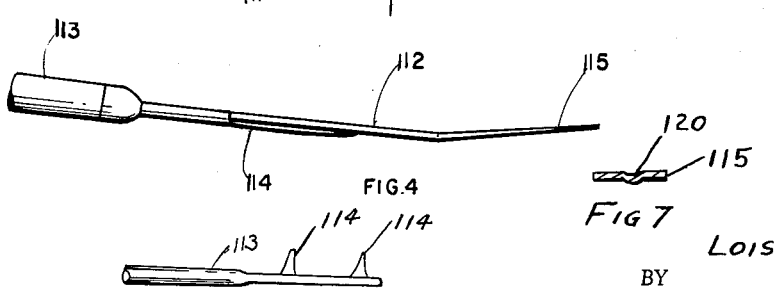
FIG. 4
FIG. 6
FIG. 7
INVENTOR.
LOIS H. FIRST
BY
Charles L. Lovercheck
attorney 3,213,779
SPATULA
Lois H. First, 5611 Lake Pleasant Road, Erie, Pa.
Filed June 19, 1963, Ser. No. 288,966
5 Claims. (Cl. 99—352)

This invention relates to spatulas and, more particularly, to spatulas for use in combination with grills for lifting foods therefrom.

The basic function of the spatula disclosed herein is to flip meat grilled on a wire type surface grill. Extreme difficulty is sometimes experienced in turning a grilled hamburger or cubed steaks as well as other meats and foods when charcoaled. The steaks and other foods snag and stick to the wire. When using a conventional flat spatula, the spatula cuts the meat and breaks it into pieces or pushes the meat across the grill ahead of the spatula.

The invention disclosed herein permits placing the prongs of the spatula between the wires or rods of the grill and prying and sliding the food onto the flat surface. It does not cut up the food and, at the same time, the prongs of the spatula permit the grease to drain from the meat or other food.

It has been discovered that the spacings for wires or rods on the grill are usually of varied spacings which fall within a range which makes it possible to utilize a grill such as disclosed herein.

It is, accordingly, an object of the present invention to provide an improved spatula.

Another object of this invention is to provide an improved spatula in combination with a grill.

A further object of the invention is to provide a spatula which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a top view of a spatula according to the invention;

FIG. 2 shows the spatula in use lifting a piece of meat from a grill;

FIG. 3 is an end view similar to the device shown in FIG. 1 constituting another embodiment of the invention;

FIG. 4 is a side view of the device shown in FIG. 3;

FIG. 5 is a cross sectional view taken on line 5—5 of FIG. 3;

FIG. 6 is a side view of a handle prior to assembly; and

FIG. 7 is a cross sectional view taken on line 7—7 of FIG. 3.

Now with more particular reference to the drawing, a grill 10 is shown in FIGS. 1 and 2 made up of spaced parallel rods with a spatula 11 shown in combination therewith. The spatula 11 has a flat plate-like body 12 with a handle 13 riveted thereto by means of rivets 14. The body 12 has fingers 15 integrally attached thereto. The fingers 15 are actually continuations of the body and are bent slightly relative thereto at 16.

The food which is shown on the grill 10 is indicated at 17. It will be noted that the fingers 15 of the spatula 11 are of such size that they can be inserted between the rods of the grill.

In FIG. 1, the rods of the grill 10 are shown in combination with the spatula so that the rods fit directly into the ends of recesses 18 between the fingers 15 so that the fingers can be completely slipped down over the rods of the grill before the handle of the spatula is rocked backwards to lift the food. The spatula can be slipped forward with the material between the fingers of the spatula sliding over the rods and, finally, the handle 13 can be rocked down so that the food is lifted on the body 12 as well as the fingers 15 of the spatula.

In the embodiment of the invention shown in FIG. 3, ends 115 of the teeth are shown. Both the teeth and body 112 are bent longitudinally along a line generally parallel to a handle 113 and at an angle of approximately five degrees so that the two halves converge together at the center.

The teeth have struck down reinforcing ribs 120. These ribs also serve as bearing surfaces when the device is used to lift food from a frying pan or the like. The reinforcing ribs 120 extend over approximately three-fourth of the length of the ends 115.

The handle 113 has rivets 114 coined to the handle for economy and ease of assembly. This also prevents food from collecting in holes and obstructions on the bottom of the handle as when ordinary rivets are used.

Knife edges 121 are formed on each side of the spatula. These knife edges can be used in cooperation with the spatula function of the device to cut meat or other food loose from the grill or griddle.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a grill and a spatula,
    said grill being adapted to be supported over a heating means to receive food thereon,
    said grille having generally parallel, spaced food supporting rods thereon,
    said spatula having a plate-like body, integrally attached, relatively long teeth attached to said body along one edge thereof, said body being bent along a line extending generally perpendicular to said spatula and spaced inwardly from the edge of said body which is integrally attached to said teeth,
    said teeth extending generally at an angle to said body and curving upwardly therefrom on said body on the opposite end from said teeth,
    said teeth having spaces therebetween to freely receive said rods of said grill whereby said teeth may pass between said rods to lift a piece of cooked food therefrom,
    said teeth being sufficiently long to extend below said grill rods a substantial distance, said teeth being sufficiently long to extend under food supported under said grill rods when a handle on said body is rocked downwardly and to lift food from said grill rods.

2. The combination recited in claim 1 wherein said rods are round,
    the spaces between said teeth are defined by ends adjacent to said body equal to the spacing of said rods and of a radius equal to the circumference of said rods,
    and said rods are adapted to be received in said round ends.

3. The combination recited in claim 1 wherein said body is bent longitudinally along a line generally parallel to said handle so that the two sides of said spatula are disposed approximately five degrees to each other.

4. The combination recited in claim 3 wherein ribs are struck down in each said tooth generally parallel to said handle whereby said ribs form bearing surfaces under said teeth.

5. The combination recited in claim 4 wherein the side edges of said body are sharpened to form knife edges.

References Cited by the Examiner

UNITED STATES PATENTS

| 1,196,526 | 8/16 | Danner | 294—7 |
| 2,064,136 | 12/36 | Winger | 294—7 |
| 2,271,812 | 2/42 | Clemings | 294—7 |
| 2,489,606 | 11/49 | Allen | 294—7 |
| 2,676,830 | 4/54 | Lawson | 294—7 |
| 2,747,911 | 5/56 | Kuever | 99—450 |

ROBERT E. PULFREY, *Primary Examiner.*

LAWRENCE CHARLES, *Examiner.*